Figure 1:
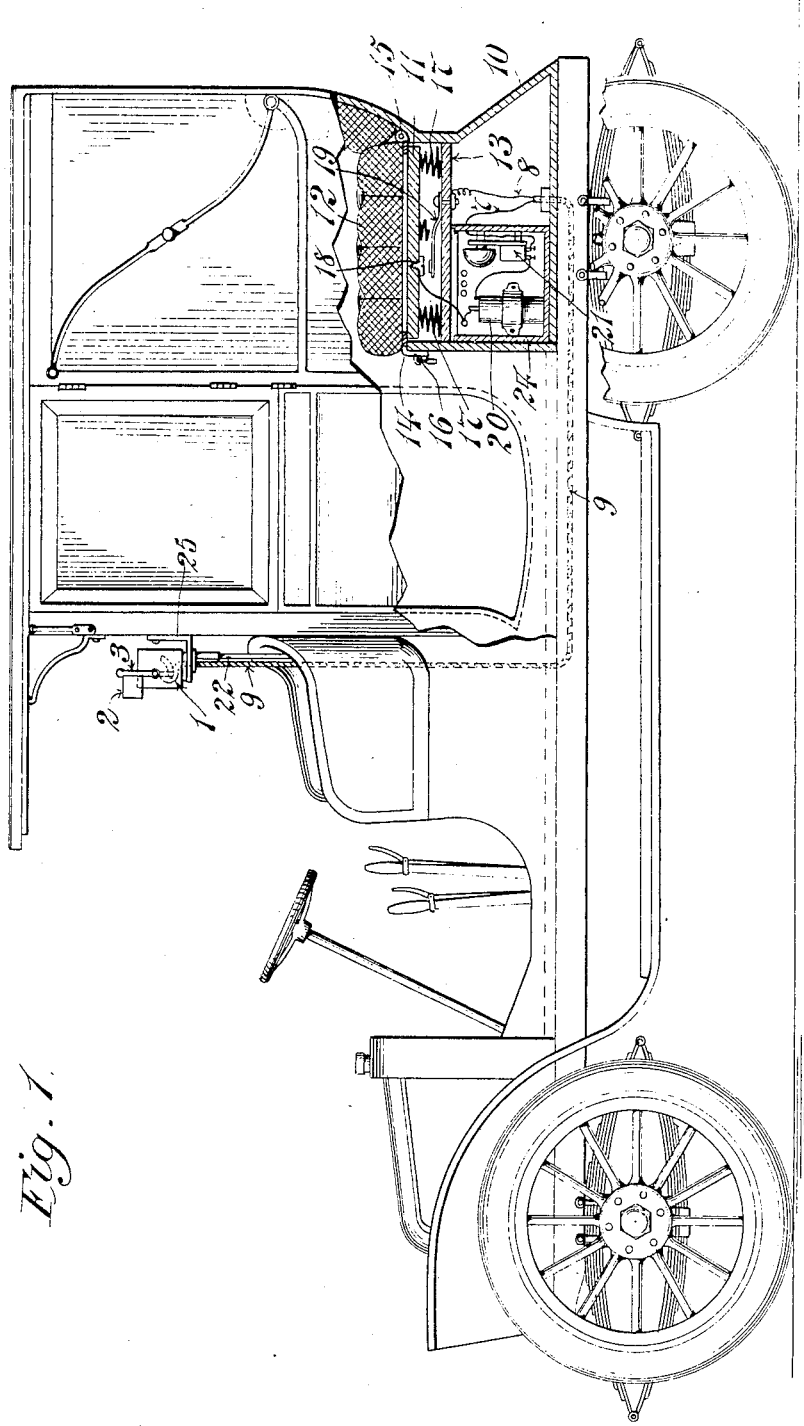

E. V. JACKA.
REGISTERING DEVICE FOR PASSENGER CONVEYING VEHICLES.
APPLICATION FILED APR. 22, 1909.

930,761.

Patented Aug. 10, 1909.

Edgar V. Jacka,
Inventor

E. V. JACKA.
REGISTERING DEVICE FOR PASSENGER CONVEYING VEHICLES.
APPLICATION FILED APR. 22, 1909.
930,761.
Patented Aug. 10, 1909.
2 SHEETS—SHEET 2.
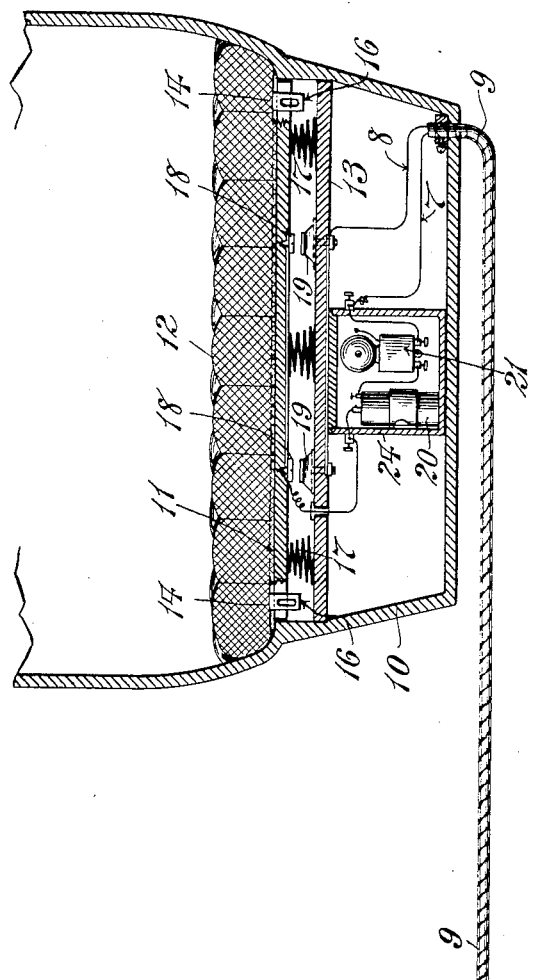
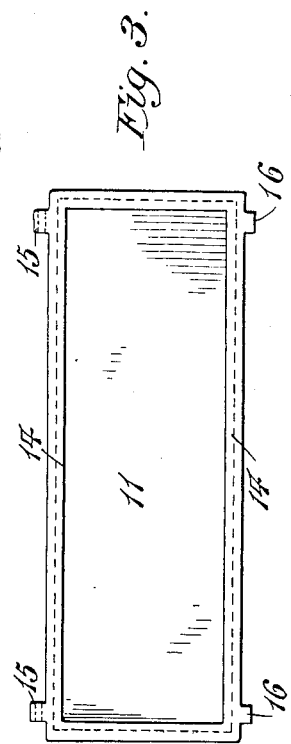
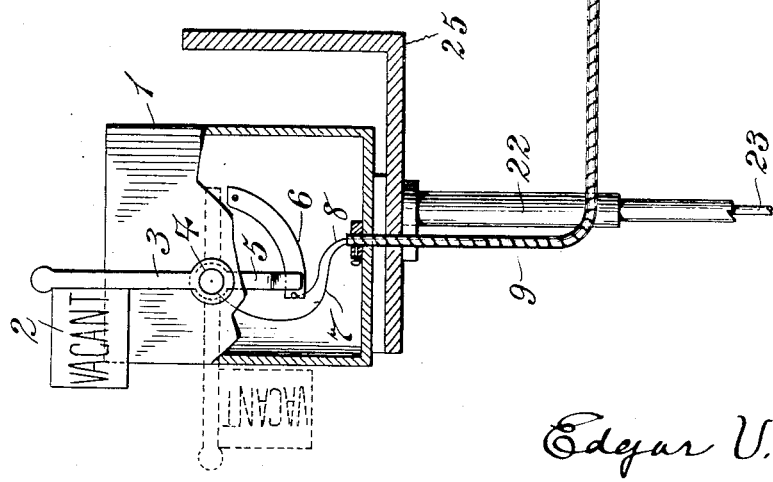
Witnesses:
Edward Rowland.
M. F. Keating.
Edgar V. Jacka
Inventor
By Attorney
Charles J. Kintner

UNITED STATES PATENT OFFICE.

EDGAR V. JACKA, OF NEW YORK, N. Y.

REGISTERING DEVICE FOR PASSENGER-CONVEYING VEHICLES.

No. 930,761.  Specification of Letters Patent.  Patented Aug. 10, 1909.

Application filed April 22, 1909. Serial No. 491,539.

*To all whom it may concern:*

Be it known that I, EDGAR V. JACKA, a citizen of the United States, and resident of New York, borough of Manhattan, county and State of New York, have made a new and useful Invention in Registering Devices for Passenger-Conveying Vehicles, of which the following is a specification.

My invention is directed particularly to novel means for preventing the attendants, drivers or chauffeurs of vehicles, such as buses, taxicabs and the like, from making false returns as to passenger conveyance or mileage receipts at the end of the day's service, and has an especial adaptability for use with registering or indicating devices known generally in the art as taximeters, in which the daily mileage the vehicle actually travels is continuously recorded or indicated on a dial of one face of the instrument and either the time, the mileage, or both; or, the actual fare charged to the passenger on a second or individual dial of another face of the instrument when a passenger is being conveyed from place to place.

To this end my invention has for its object, the bringing about of these results without error through the combined acts of the attendant or employee, as a driver or chauffeur, and the passenger himself, such acts being so correlated that when a passenger enters or remains within the vehicle, if the driver or chauffeur does not perform a certain act which will cause the passenger register of the indicator to properly register when the vehicle is traveling, this fact will be made apparent, both to the attendant and passenger, and also to other persons in the immediate vicinity, if an alarm be used, as the vehicle is moving about.

My invention will be fully understood by referring to the accompanying drawings, in which, Figure 1 represents a well known form of cab of the auto type with a taximeter closely adjacent to the chauffeur's seat, and my improvement as applied thereto, the details of the structural parts of the apparatus automatically actuated by the presence of a passenger when in the cab being shown partly in sectional view and partly in side elevational view and under the seat of the vehicle, the connections therewith between the same and the taximeter being shown in full and dotted lines. Fig. 2 represents an enlarged part elevational, part sectional view of the details of my improvement and the interconnections thereof, as between the seat of the vehicle and the indicating signal of the taximeter proper. Fig. 3 represents a plan view of the top of the seat with the cushion removed, illustrating also the manner of locking or holding the seat so as to prevent the driver or chauffeur from tampering or interfering with the operative parts of the mechanism automatically controlled by the presence of the passenger in the cab.

Existing forms of taximeters as utilized by taxicab companies throughout the United States are so constructed that during the time that the vehicle is moving about from place to place there is given on one dial of the instrument a continuous indication of the mileage traveled through the interconnection of gear mechanism controlled by the wheels of the vehicle. These devices are all securely sealed in a casing and also so constructed that when there is no passenger using the vehicle the taximeter flag or indicator stands in a definite position, as vertically, giving indication of the fact that the cab is vacant or not in service, and the relations between the staff of the aforesaid flag and the internal mechanism of the taximeter is such that when it is thrown down or when the cab is occupied additional registering mechanism is interconnected with the same gearing which drives the mileage indicating mechanism, which additional mechanism gives the actual mileage traveled; or indicates the fare to be charged therefor to the occupant of the cab, or registers the time of service.

It is found in practice that drivers or chauffeurs often defeat the purpose of such registering devices by failing to turn down the indicator flag when the cab is occupied, thus preventing the operation of the passenger registering or indicating mechanism when there is a passenger being transported from place to place. When the passenger leaves the vehicle, therefore, the driver or chauffeur makes a charge for the distance traveled and pockets the receipts, or so much of the same as he deems safe or expedient, which receipts, of course, have not been indicated on the indicator.

My invention has for its object, to defeat this fraudulent proceeding on the part of drivers or chauffeurs and I accomplish the result by providing means whereby the presence of a passenger within the cab or vehicle makes it imperative on the part of the driver or chauffeur to turn down or shift the indicator flag in such manner as to connect the passenger indicating mechanism, such means being so arranged that in the event of his failure so to do a continuous alarm will be sounded, or some portion of the operative parts of the cab or vehicle will be put out of commission, as, for instance, the rupture of the sparking circuit of the driving engine when of the explosive type; the putting on of the brakes; the rupture of the power circuit in electrically operated vehicles; in short, the producing of such an effect or result as will make it imperative on the part of the attendant or chauffeur to do what he is called upon to do; namely, connect up the passenger registering mechanism when a passenger enters or is using the vehicle.

Referring now to the drawings in detail in all of which like numerals of reference represent like parts wherever used, a cab of the auto type is shown, in which 1 represents any well known form of taximeter, such as is hereinbefore referred to, and 2 the indicator flag, 3 being the staff thereof pivoted to a shaft 4 extending into the inclosing casing of the taximeter in the usual way where it is operatively connected in a manner well known by those versed in the art, to mechanism for connecting up the passenger registering or indicating mechanism when the flag is turned to its downward position, as indicated in dotted lines in Fig. 2. Such taximeters are usually supported upon an angle iron 25 connected to the front end of the vehicle and are driven by a flexible shaft 23 extending downward through a hollow sleeve 22 and connected with gearing driven by the wheels of the vehicle. The registering dials are plainly visible to the passenger so that he may at all times note the distance traveled or the charge for time of service.

That feature of my improvement which is operatively connected with the taximeter proper consists in applying directly to the shaft 4, through a collar or otherwise and inside of the box, a downwardly extending contact arm 5, the lower end of which makes good sliding electrical contact with a curvilinear contact plate 6 secured against, but insulated from, an inner wall of the box.

7 and 8 represent respectively insulated electrical conductors running one from the shaft 4 and the other from the contact plate 6 downward to and through a flexible armored conduit 9 which is secured within the box by a collar and set-screw, as shown, so as to be absolutely inaccessible to the driver or chauffeur. This conduit, which may constitute one branch of the control circuit, 7, 8, is securely fastened upon the floor of the vehicle by eyes, not shown, but preferably closely adjacent to one of the sills, and extends backward in the manner shown in dotted lines, Fig. 1, to the rear of the vehicle, where it passes upward and is secured by a second collar and set-screw within the body 10 of the vehicle and beneath the seat, so as to be also wholly inaccessible to the chauffeur of the vehicle, the conductors 7 and 8 passing within the chamber below the seat of the vehicle, as clearly shown.

11 represents a relatively strong rectangular shaped movable seat fitting accurately within the upper part of the body 10, and 12 is the cushion therefor.

13 represents a false bottom of substantially the same contour or shape as the seat 11 and removably secured thereunder directly within the body 10.

17, 17, 17 represent a series of strong spiral springs adapted to yieldingly support the seat in its upper position and 14 represents a metallic frame preferably of steel and of relatively the same dimensions as the outer dimensions of the seat 11, said frame being provided with hinges 15, 15 secured at the rear inside the body 10 and provided on the front side with downwardly extending slotted lugs 16, 16 adapted, when the parts are in position, to fit over loops or eyes in the front face of the body and which are in turn adapted to be secured by padlocks, as shown in Fig. 1.

18, 18 18 represent stationary metallic contacts connected together by wires or conductors as shown and secured at various points on the under surface of the seat 11, and 19, 19, 19 represent corresponding flexible or yielding contacts secured directly to the upper surface of the removable false bottom 13, said contacts being in alinement respectively with the upper contacts 18, 18 but normally held out of contact therewith by the strong spiral springs 17, 17, 17.

24 represents a strong box which is adapted to be secured directly to the bottom of the vehicle in any preferred manner and which in turn contains a battery 20 securely fastened therein and an electro-magnetically controlled device illustrated as a gong or bell 21, secured also to the inner wall of said box. All of the contacts 18 are connected together and in turn connected directly to one pole of the battery 20 which in turn is connected through the bell 21 to the conductor 7. All of the fixed contacts 19 are similarly connected together and to the conductor 8. In assembling the parts under the seat of the vehicle, the box 24 and its inclosed battery and electromotive device or bell 21 are permanently secured directly to the floor. The false bottom 13 is then slipped into place with that conductor extending from the battery 20 passing therethrough, which in turn is secured to one of the upper or movable contacts 18. The seat 11 having been secured in place the frame 14 is turned to its lowest position so as to put the springs 17 under some stress, but with the contacts 18 and 19 normally disconnected, after which the pad-locks are locked and all of the parts are thus securely related in such manner that the frame 14 entirely covers the slot or space between the body 10 and the outer edges of the seat 11, thereby preventing any possibility of the driver or chauffeur tampering with or in any way preventing the operation of that part of the apparatus controlled by the presence of a passenger when seated. The cushion 12 is then put in place and the indicator flag 2 set so as to stand in the position shown in both Figs. 1 and 2, the circuits being normally open between the contacts 18 and 19, but closed between the contacts 5 and 6 in the taximeter box, so that the electromotive device or bell 21 is out of action and the battery 20 on normally open circuit.

The operation is as follows—When a passenger enters the vehicle and seats himself upon the cushion 12, the circuit is immediately closed between the fixed and movable contacts 18 and 19 through the battery 20 and bell 21, and in the event of the driver or chauffeur not having turned the indicator flag 2 down into the position shown in dotted lines the circuit will be closed from the battery and bell through the conductors 7 and 8 by way of the contact arm 5 and curvilinear contact plate 6, so that the bell 21 will continue to ring until the chauffeur effects the rotation of the flag into the position shown in dotted lines, when the circuit will be broken between the arm 5 and contact plate 6, at the same time connecting up the indicating mechanism in the manner hereinbefore referred to so that as long as the vehicle continues to move, or as long as the passenger continues seated, there will be no alarm given by the bell 21 and the passenger's fare or mileage will be simultaneously recorded with the continuous vehicle mileage.

It will be apparent that by no possibility can a passenger remain seated in the cab and not give an alarm, unless the indicator flag 2 be turned to the position shown in dotted lines Fig. 2. It will also be apparent that with such a structural arrangement I am enabled to give a correct indication of the fare registrable and time of service at all times, with the minimum application of electrical energy, it being obvious that the battery 20 is never put into use when the correct indications are effected, thereby making it possible to utilize a battery of relatively small capacity for a relatively great length of time. It is obvious that the electrical energy applied to the electro-magnet of the magnetically controlled bell 21 might be utilized in various ways to effect the result hereinbefore described and thus avoid any possibility of a driver or chauffeur defeating the purpose of the use of the taximeter: as, for instance, the controlling magnet might be utilized in a manner obvious to those skilled in the art to interrupt the sparking circuit of an explosive engine by including the armature of such magnet directly in such sparking circuit, so that when the circuit is closed through the arm 5 and curvilinear contact plate 6 of the taximeter and the contacts 18 and 19 simultaneously closed by the presence of a passenger the sparking effect upon the explosive engine would be nullified and the car cannot proceed. Obviously also the armature of the controlling magnet might be utilized to apply the brakes upon a vehicle; or to interrupt the power circuit of an electrically operated vehicle. In fact, my invention contemplates generically the utilization of electromagnetic means controlled directly by the presence of a passenger in the vehicle and simultaneously by the driver or chauffeur in such manner that if the driver or chauffeur fails to turn down or set the indicator flag to the proper position to register the passenger service, the operative parts of the vehicle will be so affected when a passenger enters the cab as to prevent movement thereof, or give an alarm indication of the wrongful act of the driver or chauffeur, until he shall have done what the requirements of the case necessitate, the generic essence of my invention lying in the utilization of an electrical circuit controlled at two points; namely, open at one point, under one condition of usage, and simultaneously closed at the other; and subsequently closed at the first-named point and open at the second, when a passenger enters the vehicle, the arrangement being such that the attendant, driver or chauffeur, is absolutely obligated to effect the proper change in his indicating flag before he can legitimately proceed with his passenger.

I am aware that it has been proposed to mechanically control the operation of a passenger registering mechanism by the presence of a passenger seated in a vehicle through the agency of a movable seat and series of levers which release the registering mechanism when the passenger is seated, which registering mechanism continues to operate so long as he remains seated, and I make no claim hereinafter broad enough to include such structural devices, my invention being distinctly directed to the automatic control of a taximeter registering device which requires the joint action of the chauffeur and the presence of the passenger to effect the necessary change for the purpose of giving a full indication or record of the service rendered to such passenger.

I do not limit my invention to the specific structural arrangement hereinbefore described and illustrated in the drawings for effecting the result sought, as obviously the means actuated by the passenger for closing the control circuit might be effected or controlled in various ways, such as would readily suggest themselves to those versed in the art of utilizing means for normally maintaining an electrical circuit open under one condition of affairs, such as the absence of the passenger from the vehicle and closing of the same through the presence of such passenger, either as he enters the vehicle or during the time he remains therein. Nor do I limit my invention to use with wheeled vehicles, such as taxicabs, buses, or the like, as obviously the same may be utilized in connection with sleighs, motor-boats, or in fact with any type of vehicle or conveyance adapted to transport passengers for a fare or consideration from point to point, which vehicles are operated by an employee, attendant, or other person upon whom it is incumbent to give certain definite indications as to the presence of such passengers.

Having thus described my invention what I claim and desire to secure by Letters Patent of the United States is:—

1. In a passenger conveyance or vehicle a taximeter driven by the vehicle; an indicator for showing if the vehicle be occupied or vacant; means operatively connected with the indicator for starting the passenger register in the taximeter, and additional means, in the nature of an alarm operatively connected with the indicator and with the interior of the conveyance whereby, through the joint action of the attendant and a passenger inside of the conveyance an alarm will be sounded if a correct registration of the service rendered be not effected, substantially as described.

2. In a passenger conveyance or vehicle a taximeter provided with an indicator adapted to show if the conveyance be occupied or vacant; electrical connections between the indicator, an electrical generator, and an electro-magnetically controlled device, all located within the interior of the conveyance; together with a circuit controller operatively connected with the seat and adapted to be actuated by a passenger when seated in the vehicle, the arrangement being such that unless the attendant sets his indicator to show that the vehicle is engaged, the electromotive device will be actuated when the conveyance is occupied, and both he and the passenger made aware of the fact that he has not properly set the register of the taximeter, substantially as described.

3. In a taxicab a seat provided with yielding normally open electrical connections located beneath the same; an indicator for disclosing whether or not the cab is occupied; a taximeter operatively connected with said indicator; a battery and an electromagnetically controlled device connected in circuit therewith; in combination with conductors extending therefrom through an armored tube or conduit to the interior of the taximeter; together with a circuit interrupter or switch operatively connected with the indicator and adapted to be actuated in such a manner as to permanently break the circuit when said indicator is set so as to show that the cab is occupied, substantially as described.

4. A cab provided with a taximeter, an electrical generator and an electromagnetically controlled device for giving warning of the proper action of the registering mechanism of the taximeter; together with an electrical circuit extending from the interior of the taximeter to said electro-magnetically controlled device; in combination with two circuit controllers in such circuit, one located inside the taximeter and the other beneath the seat of the cab, the circuit relations being such that when the cab is occupied and the register of the taximeter set for action the circuit is closed beneath the seat and broken within the taximeter, substantially as described.

5. In a cab a taximeter having all of its registering parts sealed up; an electrical circuit controller located inside the casing and operatively connected to the shaft of the taximeter signal; a pair of electrical conductors extending from said circuit controller through an armored conduit or tube to the interior of a closed chamber located beneath a removable seat yieldingly sustained; in combination with means for locking said seat in its normal or closed position; together with an electrical generator and an electromagnetically controlled alarm, all inclosed beneath the seat and connected to the aforesaid circuit, the circuit being open beneath the seat and closed within the taximeter casing when the cab is unoccupied, substantially as described.

In testimony whereof I have signed my name to this specification in the presence of two subscribing witnesses.

EDGAR V. JACKA.

Witnesses:
C. J. KINTNER,
M. F. KEATING.